(12) United States Patent
Chion et al.

(10) Patent No.: US 8,934,407 B2
(45) Date of Patent: Jan. 13, 2015

(54) MAC LAYER PACKET DATA UNITS FOR WIRELESS COMMUNICATIONS

(75) Inventors: Hua Mary Chion, Belle Mead, NJ (US); Shuyu Ma, Shenzhen (CN); Jerry Pak Lup Chow, San Diego, CA (US); Hongyun Qu, Shenzhen (CN)

(73) Assignee: ZTE (USA) Inc., Morristown, NJ (US)

( * ) Notice: Subject to any disclaimer, the term of this patent is extended or adjusted under 35 U.S.C. 154(b) by 999 days.

(21) Appl. No.: 12/554,858

(22) Filed: Sep. 4, 2009

(65) Prior Publication Data

US 2010/0135495 A1    Jun. 3, 2010

Related U.S. Application Data

(60) Provisional application No. 61/094,866, filed on Sep. 5, 2008, provisional application No. 61/094,908, filed on Sep. 6, 2008.

(51) Int. Cl.
*H04W 4/00* (2009.01)
*H04L 1/00* (2006.01)
*H04L 1/18* (2006.01)

(52) U.S. Cl.
CPC ............ *H04L 1/0083* (2013.01); *H04L 1/0079* (2013.01); *H04L 1/0025* (2013.01); *H04L 1/0057* (2013.01); *H04L 1/1812* (2013.01)
USPC .......................................... 370/328; 370/338

(58) Field of Classification Search
None
See application file for complete search history.

(56) References Cited

U.S. PATENT DOCUMENTS

| | | | |
|---|---|---|---|
| 7,339,921 B2 | 3/2008 | Kim et al. | |
| 2002/0097701 A1* | 7/2002 | Lupien et al. | 370/338 |
| 2007/0047432 A1 | 3/2007 | Cho et al. | |
| 2007/0097945 A1 | 5/2007 | Wang et al. | |
| 2008/0137601 A1 | 6/2008 | Sung et al. | |
| 2008/0212513 A1 | 9/2008 | Tao et al. | |
| 2009/0034526 A1* | 2/2009 | Ahmadi et al. | 370/392 |
| 2009/0092076 A1* | 4/2009 | Zheng et al. | 370/328 |
| 2009/0103561 A1* | 4/2009 | Qi et al. | 370/468 |
| 2009/0116436 A1* | 5/2009 | Okuda | 370/329 |
| 2009/0310533 A1* | 12/2009 | Zheng et al. | 370/328 |

OTHER PUBLICATIONS

Hamiti, S "The Draft IEEE 802.16m System Description Document," IEEE Std. 802.16m-08/003r4, 89 pages, Jul. 29, 2008.
IEEE Standard for Local and Metropolitan Area Networks, "Part 16: Air Interface for Fixed Mobile Broadband Wireless Access Systems," IEEE Std 802.16e-2005, 864 pages, Feb. 28, 2006.

* cited by examiner

*Primary Examiner* — Ayaz Sheikh
*Assistant Examiner* — Sori Aga
(74) *Attorney, Agent, or Firm* — Perkins Coie LLP

(57) ABSTRACT

Technologies for wireless communications can include communicating connection information that specifies one or more parameters of a connection between a base station and a wireless device. The connection information can be indicative of one or more of: a station identifier, whether data packets associated with the connection include a cyclic redundancy check, and whether data packets associated with the connection include encrypted information. These technologies can include constructing, based on the connection information, a media access control (MAC) protocol data unit (PDU) that includes a header at a beginning portion of the MAC PDU. The header can include one or more of: a first flag that indicates a header type, a second flag that indicates whether there is a subheader inclusion following the header in the MAC PDU, a flow identifier that, together with the station identifier, identifies the connection, and a length value.

26 Claims, 7 Drawing Sheets

MAC LAYER PACKET DATA UNITS FOR WIRELESS COMMUNICATIONS

PRIORITY CLAIM AND CROSS REFERENCE TO RELATED APPLICATIONS

This document claims the benefit of the priority of U.S. Provisional Application Ser. No. 61/094,866, filed Sep. 5, 2008 and entitled "MAC Layer Packet Data Units for OFDMA Wireless Communications" and claims the benefit of the priority of U.S. Provisional Application Ser. No. 61/094,908, filed Sep. 6, 2008 and entitled "Designs and operations of MAC Layer Packet Data Units for OFDMA Wireless Communications." The entire contents of all of the above identified documents are hereby incorporated by reference.

BACKGROUND

This document relates to wireless communications.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station can emit radio signals that carry data such as voice data and other data content to wireless devices. A base stations can be referred to as an access point (AP) or access network (AN) or can be included as part of an access network. Further, a wireless communication system can include one or more access networks to control one or more base stations. A wireless device can use one or more different wireless technologies for communications. Various wireless technologies examples include Long-Term Evolution (LTE), Code division Multiple Access (CDMA) such as CDMA2000 1x, High Rate Packet Data (HRPD), Universal Mobile Telecommunications System (UMTS), High Speed Packet Access (HSPA), and Worldwide Interoperability for Microwave Access (WiMAX).

Various wireless communication system can use Orthogonal Frequency Division Multiplexing (OFDM) technology to transmit and receive wireless signals. In some implementations, wireless communication system can use Orthogonal Frequency Division Multiple Access (OFDMA), which is a multi-user version of OFDM technology. The multiple access is achieved in OFDMA by assigning subsets of orthogonal subcarriers to individual subscriber stations. OFDMA may be viewed as a combination of frequency domain and time domain multiple access where radio resources are partitioned in a time-frequency space, and network user data bursts are assigned along the OFDM symbol index as well as OFDM sub-carrier index. OFDMA has been widely adopted by various standard bodies.

Wireless communication systems can use a media access control (MAC) layer to communicate data between a wireless device and a base station. A wireless communication system can use a MAC protocol data unit (PDU) to encapsulate data for transmission. A MAC PDU (MPDU) can include a header, can include data payload, and can include error detection information. A MPDU can include one or more full or partial service data unit (SDUs). A SDU can include one or more bytes of data associated with a connection.

SUMMARY

This document describes technologies, among other things, for wireless communications between radio stations such as wireless devices and base stations.

This document describes, among others, methods for wireless communications that can include communicating connection information that specifies one or more parameters of a connection between a base station and a wireless device; constructing, based on the connection information, a media access control (MAC) protocol data unit (PDU) that includes a header at a beginning portion of the MAC PDU, and communicating the MAC PDU between the base station and the wireless device. The connection information can be indicative of one or more of: a station identifier, whether data packets associated with the connection include a cyclic redundancy check, and whether data packets associated with the connection include encrypted information. A header can include one or more of: a first flag that indicates a header type, a second flag that indicates whether there is a subheader inclusion following the header in the MAC PDU, a flow identifier that, together with the station identifier, identifies the connection, and a length value that indicates a length of the MAC PDU. Other implementations can include corresponding systems, apparatus, and computer programs, configured to perform the actions of the techniques, encoded on computer readable mediums.

Implementations can optionally include one or more of the following features. Communicating the MAC PDU can include transmitting a signal, based on Orthogonal Frequency Division Multiple Access (OFDMA), that can include the MAC PDU. In some implementations, the connection information is indicative of whether a hybrid Hybrid Automatic Repeat Request (HARD) is used in association with the connection. Constructing the MAC PDU can include including a subheader immediately following the header in the MAC PDU. The second flag can indicate a presence of the subheader. The subheader can include a flag that indicates whether, following the subheader header in the MAC PDU, there is an inclusion of an additional subheader in the MAC PDU. The subheader can include a type field that indicates a type of the subheader.

Constructing the MAC PDU can include including a fragmentation subheader in the MAC PDU; and including, immediately after the fragmentation subheader, a portion of a service data unit. In some implementations, the fragmentation subheader is a last subheader in the MAC PDU, where the fragmentation subheader does not include subheader type identifier information. Constructing the MAC PDU can include including a packing subheader in the MAC PDU; and including, immediately after the packing subheader, at least a portion of a service data unit. In some implementations, the packing subheader is a last subheader in the MAC PDU, where the packing subheader does not include subheader type identifier information.

In some implementations, the first flag is one bit in size. In some implementations, the second flag is one bit in size. In some implementations, the header does not include cyclic redundancy check indication (CI) bit. In some implementations, the header does not include an Encryption Control (EC) bit. In some implementations, the header does not include the station identifier. In some implementations, the header does not include a TYPE field that specifies which subheaders are included in the MAC PDU via a bit map.

In some implementations, a layout of the header is based on one of multiple header types including a first header type that can include a first length field and a different, second header type the can include a second length field, wherein the second length field is smaller than the first length field.

In some implementations, the layout of the header is based on the first header type, wherein the header can include a header check sequence to support header error detection, the header check sequence being based on a portion of the header. In some implementations, a field size of the header check sequence is one of 5 bits, 6 bits, or 7 bits. In some implementations, the header can include an Encryption Key Sequence (EKS) identifier that signals information about an encryption key associated with one or more encrypted portions of the MAC PDU. In some implementations, a field size of the EKS is one bit.

In some implementations, the layout of the header is based on the second header type, wherein the header can include a flag that indicates whether there is a change of a traffic encryption key, where the header can include a flag that indicates whether there is a change of a traffic encryption key. In some implementations, the header does not include cyclic redundancy check indication (CI) bit, where the header does not include an Encryption Control (EC) bit, where the header does not include the station identifier, where the header does not include a header check sequence (HCS). In some implementations, the header does not include a TYPE field that specifies which subheaders are included in the MAC PDU via a bit map.

Implementations can include communicating a signal between the base station and the wireless device, the signal comprising a signaling MAC header. A signaling MAC header can include a flag that distinguishes between a signaling MAC header type and a compact MAC header type for data, can include a flag that indicates whether there is a subheader inclusion following the signaling MAC header, can include a flag that signals an association with a MAC management connection, can include a flag that indicates whether there is a change of a traffic encryption key; and can include a header check sequence (HCS) to support header error detection. the header check sequence being based on a portion of the signaling MAC header. In some implementations, a field size of the header check sequence is one of 5 bits, 6 bits, or 7 bits.

In another aspect, methods for wireless communications can include operating one or more base stations to provide wireless communications to wireless devices based on Orthogonal Frequency Division Multiple Access (OFDMA); and providing media access control (MAC) layer packet data unit (PDU) header types to reduce transmission overhead and support adaptive subheaders for OFDMA wireless communications.

Implementations can optionally include one or more of the following features. Implementations can include constructing a generic MAC header. A generic MAC header can include a Flow Identifier (FID) to identify a connection associated with a wireless device. In some implementations, a generic MAC header is free of a cyclic redundancy check indication (CI) bit. In some implementations, a generic MAC header is free of an Encryption Control (EC) bit. In some implementations, a generic MAC header is free of a Station ID (STID) field. Implementation can include providing information on the CRC inclusion and data encryption during a connection setup. Implementations can include providing information indicative of the STID in a resource allocation signaling.

In some implementations, a generic MAC header can include a subheader indication (SI) bit indicating whether a subheader immediately follows the generic MAC header. In some implementations, a generic MAC header does not include a TYPE field that specifies a subheader type. Implementations can include including one or more subheaders immediately following the generic MAC header when the SI bit is set to one. Implementations can include constructing a subheader that includes a TYPE field that indicates a type of the subheader. A subheader can include a SI bit to indicate whether an additional subheader immediately follows the subheader. Implementations can include generating a MAC PDU (MPDU) that includes a payload associated with a connection; and including a specific subheader as the last subheader immediately before the payload, the specific subheader including fragmentation or packing information. In some implementations, the specific subheader is free of a TYPE for subheader. In some implementations, a generic MAC header can include a Header Check Sequence (HCS) that has a length value being one of 5 bits, 6 bits, or 7 bits. A generic MAC header can include a one-bit Encryption Key Sequence (EKS) to signal a change in a traffic encryption key associated with a connection.

Implementations can include providing a compact MAC header type to support data traffic associated with a length of less than 128 bytes for OFDMA wireless communications. Implementations can include constructing a compact MAC header that includes a length field. A compact MAC header can include a subheader indication (SI) bit indicating whether a subheader immediately follows the compact MAC header. In some implementations, a compact MAC header does not include a TYPE field that specifies a subheader type. In some implementations, a compact MAC header is free of a Header Check Sequence (HCS). Implementations can include including one or more subheaders immediately following the compact MAC header when the SI bit is set to one. In some implementations, a compact MAC header is free of a cyclic redundancy check indication (CI) bit. In some implementations, a compact MAC header is free of an Encryption Control (EC) bit. In some implementations, a compact MAC header is free of a Station ID (STID) field.

Implementations can include providing a signaling MAC header type to support signaling traffic for OFDMA wireless communications. A signaling MAC header type can include a reduced flow identifier (RFID) to indicate a management connection, can include a Subheader Indication (SI) bit to indicate whether a subheader immediately follows in a MAC PDU, can include a one-bit Encryption Key Sequence (EKS) to signal a change in a traffic encryption key associated with a connection, and can include a Header Check Sequence (HCS).

In another aspect, technologies for wireless communications can include constructing a media access control (MAC) protocol data unit (PDU) that includes a header at a beginning portion of the MAC PDU. The header can include a first flag that indicates a header type, a second flag that indicates whether there is a subheader inclusion following the header in the MAC PDU, a flow identifier that, together with the station identifier, identifies the connection, and a length value that indicates a length of the MAC PDU; and communicating the MAC PDU between the base station and the wireless device.

Systems for wireless communications can include multiple base stations to provide wireless communications to wireless devices A base station can be configured to communicate connection information that specifies one or more parameters of a connection between a base station and a wireless device, the connection information indicative of (i) a station identifier, (ii) whether data packets associated with the connection include a cyclic redundancy check, and (iii) whether data packets associated with the connection include encrypted information; construct, based on the connection information, a media access control (MAC) protocol data unit (PDU) that includes a header at a beginning portion of the MAC PDU, the header comprising: (i) a first flag that indicates a header type, (ii) a second flag that indicates whether there is a subheader inclusion following the header in the MAC PDU, (iii) a flow identifier that, together with the station identifier, identifies the connection, and (iv) a length value that indicates a length of the MAC PDU; and communicate the MAC PDU between to one or more wireless devices. In some implementations, the base station is configured to select one or more header types for inclusion into a MAC PDU, the header types include a generic MAC header, a compact MAC header, and a signaling MAC header.

In another aspect, methods for wireless communications can include communicating connection information that specifies one or more parameters of a connection between a base station and a wireless device, the connection information indicative of (i) a station identifier, (ii) whether data packets associated with the connection include a cyclic redundancy check, (iii) whether data packets associated with the connection include encrypted information, and (iv) whether Hybrid ARQ is used; and constructing, based on the connection information, a media access control (MAC) protocol data unit (PDU) that includes a header at a beginning portion of the MAC PDU. Other implementations can include corresponding systems, apparatus, and computer programs, configured to perform the actions of the techniques, encoded on computer readable mediums.

Implementations can optionally include one or more of the following features. A header can be a generic MAC header that includes a first flag that indicates a header type, a second flag that indicates whether there is a subheader inclusion following the header in the MAC PDU, a FID that, together with the station identifier, identifies the connection, and a length value that indicates a length of the MAC PDU.

In some implementations, constructing the MAC PDU can include including a data burst in the MAC PDU that is of smaller size; and using a compact MAC header as the header to provide information regarding the data burst, where the compact MAC header has a reduced field size for the length value due to a restricted amount of data to be carried within the MAC PDU, where the first flag indicates the use of the compact MAC header format. The compact MAC header can include a first flag that indicates a header type, a second flag that indicates whether there is a subheader inclusion following the header in the MAC PDU, a Flow Identification (FID) identifier that, together with the station identifier, identifies the connection, a length value that indicates a length of the MAC PDU, and an Encryption Key Sequence (EKS) identifier that identifies the encryption key that is used to encrypt the protected portions of the MAC PDU. In some implementations, the compact MAC header does not include a header check sequence, a Station Identifier (STID), a flag to indicate inclusion of CRC, a flag to indicate inclusion of encryption control information, and a bit map of included subheader.

Implementations can include using a signaling MAC header to provide information regarding the carrying of signaling only within the MAC PDU. The signaling MAC header can be identified as an alternative format of a compact MAC header. The signaling MAC header can include a flag that distinguishes between a signaling MAC header type and a compact MAC header type for data; a Subheader Indication (SI) flag that indicates whether there is a subheader inclusion following the signaling MAC header; a reduced Flow Identification (FID) field that identifies the MAC management connection associated with the signaling information; a Encryption Key Sequence (EKS) flag that indicates whether there is a change of a traffic encryption key; and a header check sequence (HCS) to support header error detection, the header check sequence being based on a portion of the signaling MAC header.

The details of one or more implementations are set forth in the accompanying attachments, the drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

Some wireless communications systems can use multiple fields in a message header to signal information about a connection such as connection identity, long header type fields, e.g., 5-bits or more, various flags to signal connection parameters such as inclusion of error detection information and encryption. Long message headers can reduce bandwidth and increase latency in communications between wireless devices and base stations. Latency sensitive applications can suffer delays as a result of too many fields in associated message headers that carry data for the applications.

This documents describes technologies and message header layouts that streamline message headers and reduce latency in wireless communications. Examples of MAC layer packet data units (PDUs) layouts are provided that achieve one or more operational features which, among others, include reduction of transmission overhead and support for adaptive subheaders in wireless communication systems such as ones based on IEEE 802.16m. This document includes details and examples of MAC header and subheaders that can have one or more of the following potential advantages: shorten generic MAC header that reduce overhead, flexible expansion of subheaders, unify signaling MAC header design, and increased efficiency for service types with small MAC PDU size such as VoIP and signal MAC header and messages.

Figure 1:
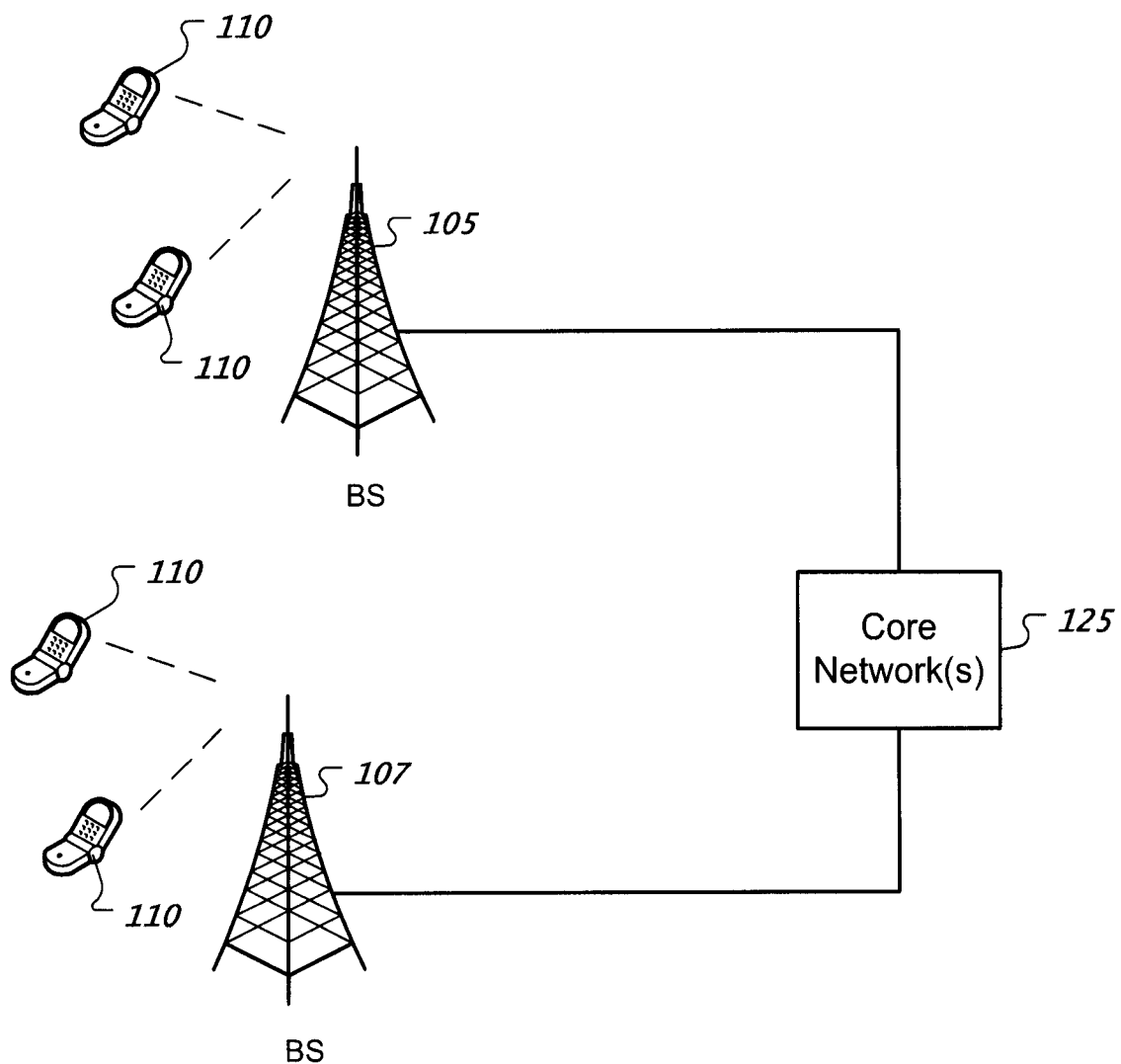
FIG. 1 shows an example of a wireless communication system.

FIG. 1 shows an example of a wireless communication system. A wireless communication system can include one or more base stations (BSs) 105, 107 and one or more wireless devices 110. A base station 105, 107 can transmit a signal on a forward link (FL), called a downlink (DL) signal, to one or more wireless devices 110. A wireless device 110 can transmit a signal on a reverse link (RL), called an uplink (UL) signal, to one or more base stations 105, 107. A wireless communication system can include one or more core networks 125 to control one or more base stations 105, 107. Examples of wireless communication systems that can implement the present techniques and systems include, among others, wireless communication systems based on orthogonal frequency-division multiplexing (OFDM), Orthogonal Frequency-Division Multiple Access (OFDMA), and Code division Multiple Access (CDMA). Some wireless communication system can use one or more of the following to communicate: CDMA2000 1x, High Rate Packet Data (HRPD), Long-Term Evolution (LTE), Universal Terrestrial Radio Access Network (UTRAN), Universal Mobile Telecommunications System (UMTS), and Worldwide Interoperability for Microwave Access (WiMAX).

Figure 2:
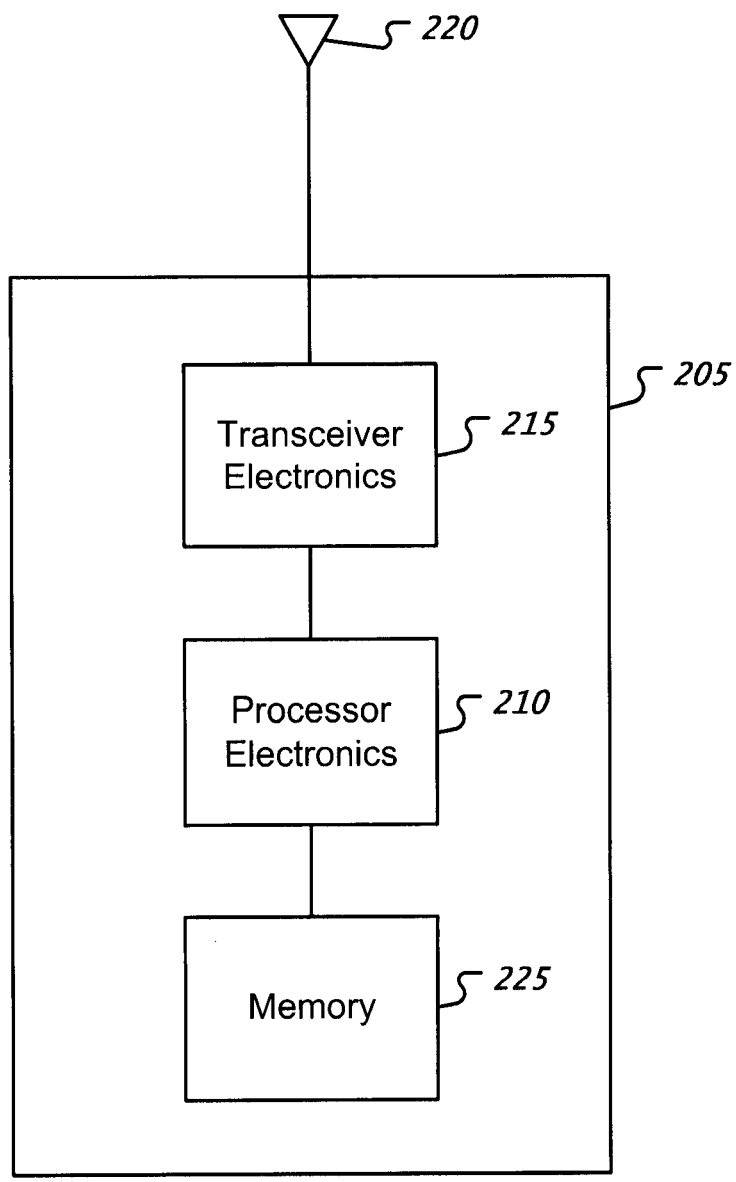
FIG. 2 shows an example of a radio station architecture.

FIG. 2 shows an example of a radio station architecture. Various examples of radio stations include base stations and wireless devices. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on an OFDM air interface which can include an OFDMA air interface. In some implementations, radio stations 205 can communicate with each other based on a CDMA air interface. In some implementations, radio stations 205 can communicate using one or more wireless technologies such as WiMAX, LTE, CDMA2000 1x, HRPD, and UMTS.

A wireless communication system can use different types of headers for wireless communications. A wireless device can use one or more types of headers for UL transmissions. Similarly, a base station can use one or more types of headers for DL transmissions. A wireless communication system can provide one or more types of headers associated with short data transmissions and can provide one or more types of headers associated with longer data transmissions. Different header types can have different sizes. For example, a header type associated with a short data transmission can have a smaller size than a header type associated with a longer data transmission. A smaller size can result in a reduced transmission latency.

Various examples of headers such as MAC header types include a generic MAC header (GMH), compressed MAC header (CMH), and a signaling MAC header (SMH). In some implementations, a wireless communication system can use a GMH for data traffic when the length of a MAC PDU (MPDU) is equal to or greater than 128 bytes. In some implementations, a wireless communication system can use a CMH for data traffic when the length of a MPDU is smaller than 128 bytes. In some implementations, a wireless communication system can use a SMH for MAC signaling traffic which can include one or more signaling messages.

In some implementations, a radio station can include error detection information, e.g., a header check sequence, in a header such as a GMH or a SMH to assist a receiver in detecting transmission errors in the header portion of a MPDU. A header check sequence can include a cyclic redundancy check (CRC) based on a portion of the header. In some implementations, a radio station can include error detection information, such as a cyclic redundancy check (CRC), in a MPDU to assist a receiver in detecting transmission errors in the entire MPDU. In some implementations, a CMH type does not include a header check sequence to conserve header size, and a radio station that receives a MPDU with such a CMH can use an included CRC to perform error detection. In some implementations, a radio station can use a Hybrid Automatic Repeat Request (HARD) technique to handle transmissions errors.

Figure 3A:
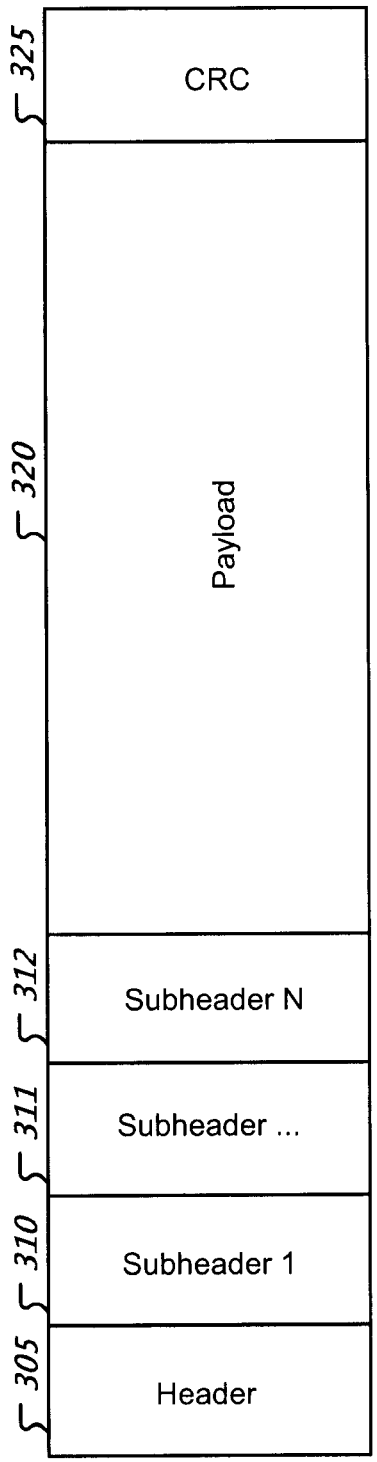
FIG. 3A shows an example of a layout of a MAC PDU.

FIG. 3A shows an example of a layout of a MPDU. A MPDU can include a header 305. Various examples of a header 305 include a GMH, CMH, and a SMH. In some cases, a MPDU can include one or more subheaders 310, 311, 312. The header 305 can include a flag that indicates whether a subheader follows the header 305 in the MAC PDU. A subheader 310, 311, 312 can include a flag that indicates whether an additional subheader follows or not. A MPDU can include a payload 320. A MPDU can include a CRC 325. In some implementations, the inclusion of a CRC can be determined by a configuration parameter. In some implementations, the inclusion of a CRC can be determined by exchanging a CRC inclusion parameter between radio stations before communicating data in the connection.

Figure 3B:
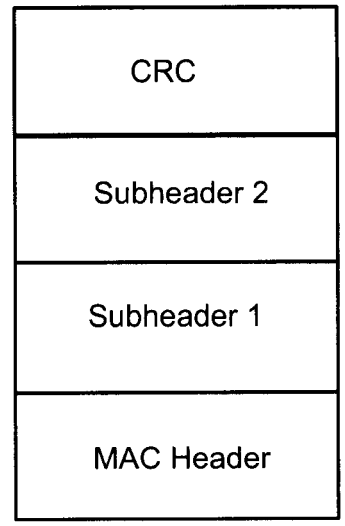
FIG. 3B shows a different example of a layout of a MAC PDU.

FIG. 3B shows a different example of a layout of a MAC PDU. A MPDU can include a header followed by one or more subheaders, and can be without a SDU. For example, a MPDU can include signaling information for a connection and without carrying user data for the connection. A MPDU can include a CRC.

A radio station can use header types such as GMH and CMH to carry connection data in a MPDU. Connection data can include at least a portion of a SDU. A SDU can include one or more bytes of data associated with a connection. Header types such as GMH and CMH can include a flow identifier (FID) that identifies a connection associated with a wireless device. In some implementations, a station identifier (STID) and a FID can uniquely identify a connection between a wireless device and a base station. A wireless device and a base station can exchange connection information, which can include a STID, during connection setup. The wireless device and the base station can associate a STID with a connection during connection setup and use send a FID to differentiate flows. In some implementations, a STID can be included in a resource allocation message.

In some implementations, CRC inclusion and packet data encryption can be enabled at connection setup and can be consistent for multiple MPDU carried over a connection. Radio stations can exchange connection information that specifies one or more parameters of a connection such as whether packets contain a CRC and whether packets contain encrypted information.

In some implementations, a MAC header can include an encryption key sequence (EKS) field, which can be one bit in size. An EKS value can signal a change in an associated traffic encryption key (TEK). For example, when the sender of a MPDU changes a TEK, the sender can signal the change by setting an EKS bit to one in associated MPDUs.

In some implementations, a MAC header can include an indication bit such as a subheader inclusion (SI) bit in lieu of a type field for a subheader to conserve header space. A SI field can indicate an inclusion of one or more subheaders. A SI field can support increased flexibility in growth of future subheader types.

Some MAC header types can include a header check sequence (HCS) field. In some implementations, header types that include a HCS can have different sizes for the HCS field. In some implementations, a GMH can include a HCS field that is 8 bits long. In some implementations, a GMH can include a HCS field that is 5 bits longs. A longer HCS can result in better error detection. A probability of missing a burst error bigger than N bits, where N is the size of a HCS field, can increase from $2^{-8}$ to $2^{-5}$ when decreasing the HCS from 8 to 5 bits. However, a corresponding reduction in header size can reduce the conflict ratio. For example, reducing the size of a MAC header from 5 bytes to 2 bytes, can result in a reduction of the conflict ratio, e.g., from $1/2^{\wedge}40$ to $1/2^{\wedge}16$.

Figure 4A:
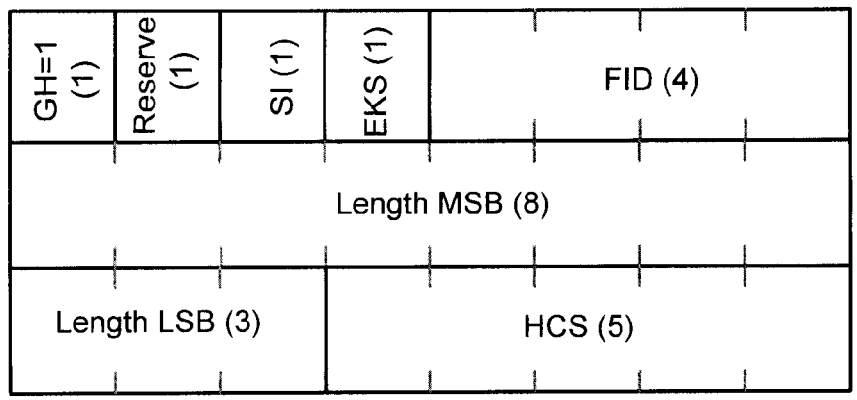
FIG. 4A shows an example of a generic MAC header with a five bit header check sequence.

FIG. 4A shows an example of a generic MAC header with a five bit header check sequence. A wireless communication system can use a generic MAC header (GMH) to transmit and receive data. A GMH can include flag such as a GMH indicator (GH). In some implementations, a GH value of one indicates that a header is a GMH. A GMH can include an EKS bit to indicate the change of TEK at the sender. A GMH can include a SI bit to indicate an inclusion of one or more subheaders. A GMH can include a length field to indicate a MPDU length. In some implementations, the MPDU length can be inclusive of the CRC length. The length field can be divided into a most significant bits (MSB) portion field of the value and a least significant bits (LSB) portion field of the value. In some implementations, the GMH can include a 11 bit length field. In some implementations, a GMH can include a HCS field, which can be 5 bits in length. In some implementations, a generic MAC header does not include the 5-bit TYPE field as specified in the IEEE 802.16m standard.

Figure 4B:
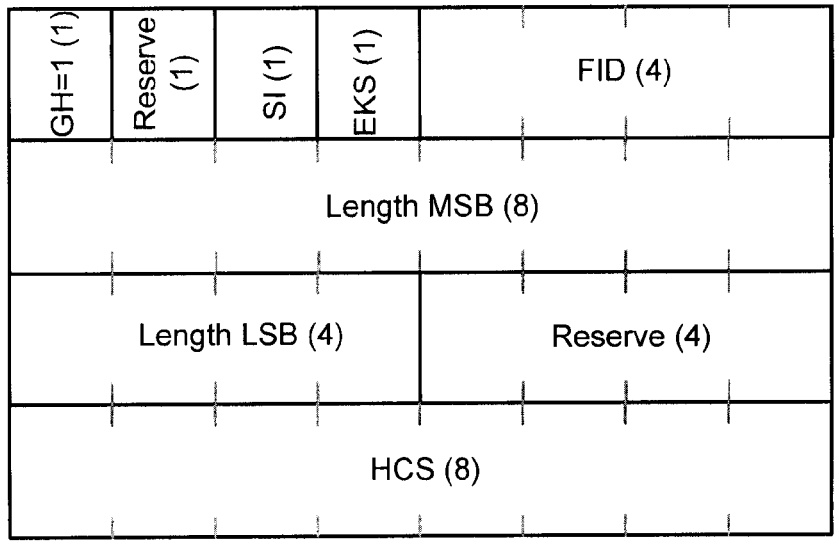
FIG. 4B shows an example of a generic MAC header with an eight bit header check sequence.

FIG. 4B shows an example of a generic MAC header with an eight bit header check sequence. In some implementations, a GMH can include a HCS field that is 8 bits in length.

Figure 4C:
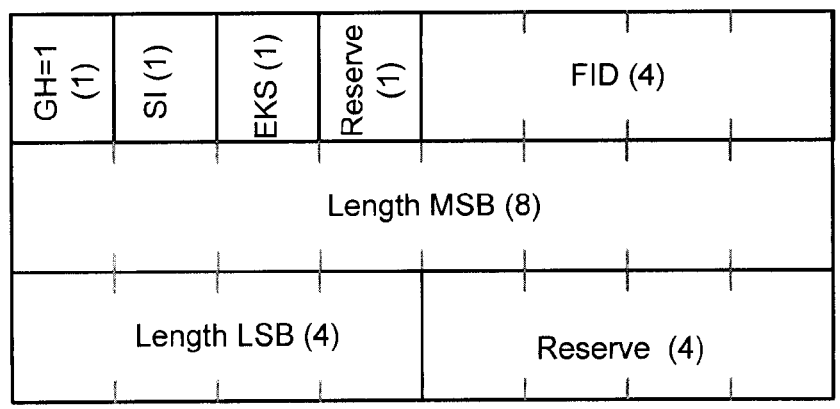
FIG. 4C shows an example of a generic MAC header without a header check sequence.

FIG. 4C shows an example of a generic MAC header without a header check sequence. In some implementations, a GMH does not include a HCS field.

Wireless communication system can use a CMH to transport data such as small data bursts, such as ones associated with Voice-over-Internet-Protocol (VoIP), to generate smaller MPDUs which can reduce MAC overhead and decrease latency. In some implementations, the CMH does include a HCS and can require connection that use CMHs to use CRC or HARQ. In some implementations, a size of CMH can equal a size of a SMH, and such headers can include a signaling subheader (SH) to differentiate between such headers.

Figure 5:
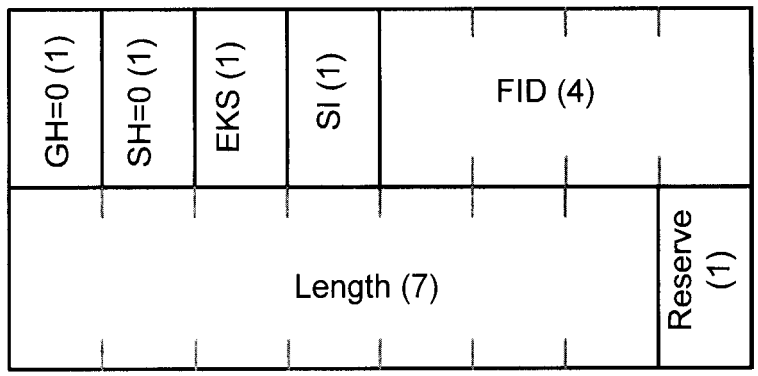
FIG. 5 shows an example of a compressed MAC header without a header check sequence.

FIG. 5 shows an example of a compressed MAC header without a header check sequence. A radio station can use a CMH to transmit and receive connection data. A CMH can include a GH field, which can be set to zero for a CMH. A CMH can include a SH indicator, which can be set to zero for a CMH. A CMH can include an EKS field to indicate a change of a TEK at a sender. A CMH can include a SI field, which can indicate an inclusion of a subheader. A CMH can include a FID field. A CMH can include a length field to indicate a length of a MPDU that includes the CMH. In some implementations, a MPDU encapsulated by a CMH can have a maximum length of 128 bytes. In some implementations, a compressed MAC header does not include the 5-bit TYPE field as specified in the IEEE 802.16m standard. A compressed MAC header can be referred to as a compact MAC header.

A radio station can use a SMH to carry MAC signaling information in a MPDU. In some cases, a MPDU consists of a SMH. In some cases, a MPDU can include a SMH with one or more subheaders. In some cases, a MPDU can include a SMH and a CRC. In some implementations, a SMH begins a MPDU with one or more management messages. A SMH can be used to convey MAC control signaling and can be carried over a MAC management connection. A Reduced FID (RFID) can be used to signal the management connection. For example, a SMH can include a one-bit RFID field, with a zero value representing a basic connection and a one value representing a primary management connection.

Figure 6A:
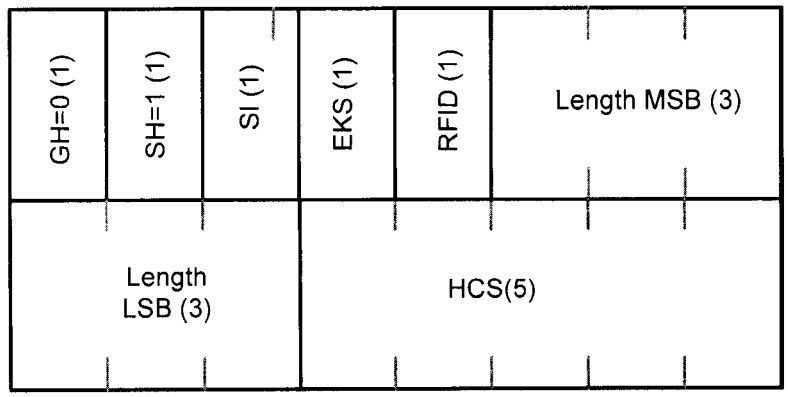
FIG. 6A shows an example of a signaling MAC header with a five bit header check sequence.

FIG. 6A shows an example of a signaling MAC header with a five bit header check sequence. A wireless communication system can use a signaling MAC header (SMH) to transmit and receive signaling information. A SMH can include a GH field, which can be set to zero for a SMH. A SMH can include a signaling header indicator (SH), which can be set to one for a SMH. A SMH can include a SI field, which can indicate an inclusion of one or more subheaders. A SMH can include an EKS field to indicate a change of a TEK at a sender. A SMH can include a Reduced FID (RFID) field to signal information associated with a management connection. A SMH can include a length field to indicate a length of a MPDU, including CRC. A SMH can include a HCS field. In some implementations, the size of a HCS field is five bits. In some implementations, a SMH does not include the 5-bit TYPE field as specified in the IEEE 802.16m standard.

Figure 6B:
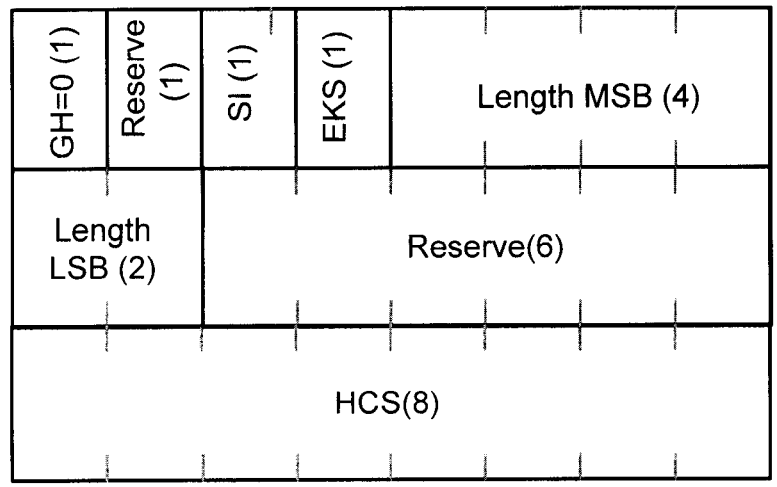
FIG. 6B shows an example of a signaling MAC header with an eight bit header check sequence.

FIG. 6B shows an example of a signaling MAC header with an eight bit header check sequence. In some implementations, the size of a HCS field is eights bits. As illustrated by FIGS. 6A and 6B, different configurations of a SMH can be implemented to accommodate different HCS field sizes.

A wireless communication system can use various types of subheaders such as a fragmentation subheader, grant management subheader, packing subheader, fast feedback subheader, automatic retransmission request (ARQ) feedback subheader and extended subheader, e.g., 6 DL extended subheader field (ESF) and 5 UL extended subheader field (ESF). A MPDU can include one or more fragmentation subheaders if fragmentation is enabled for a connection. A MPDU can include one or more packing subheaders if packing is enabled for a connection. A wireless communication system can include one or more types of subheaders in a MPDU.

Figure 7:
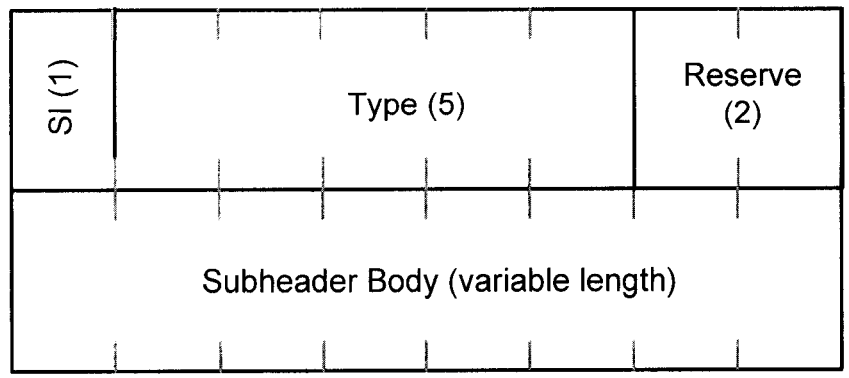
FIG. 7 shows an example of a subheader format.

FIG. 7 shows an example of a subheader format. A MAC subheader can include a SI bit. When a SI bit is set in a subheader, at least another subheader follows the subheader. In some implementations, a SI bit can indicate at least one more subheader is included immediately following the current subheader. In some implementations, a subheader can include a TYPE field that indicates a subheader type. In some implementations, a TYPE field value is associated with a length of a subheader body such that the subheader is not required to have an explicit length value.

Figure 8:
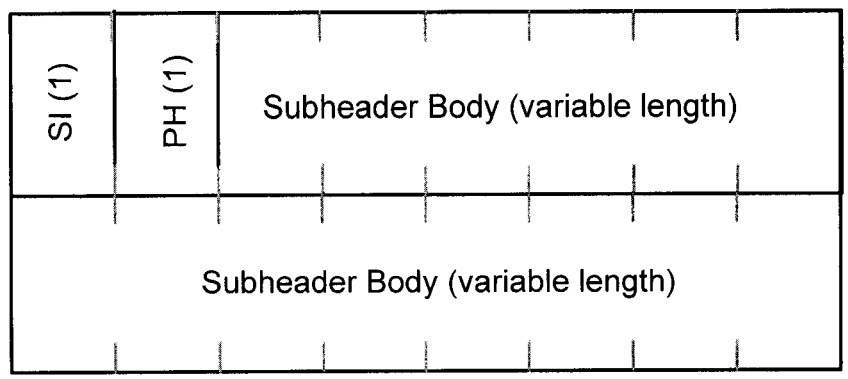
FIG. 8 shows an example of a subheader format for fragmentation and packing subheaders.

FIG. 8 shows an example of a subheader format for fragmentation and packing subheaders. A MAC subheader can include a SI bit. When a SI bit is set, at least one or more subheader is present in the MPDU. In some implementations, the inclusion of a fragmentation and packing subheaders are determined at connection set up. In some implementations, the last subheader immediately before a payload can be either a fragmentation subheader or a packing subheader when a fragmentation or packing option is enabled. Fragmentation and packing subheaders can include a PH field to differentiate between fragmentation and packing subheaders. A MPDU can include multiple packing subheaders with each packing subheader followed by a SDU.

Figure 9:
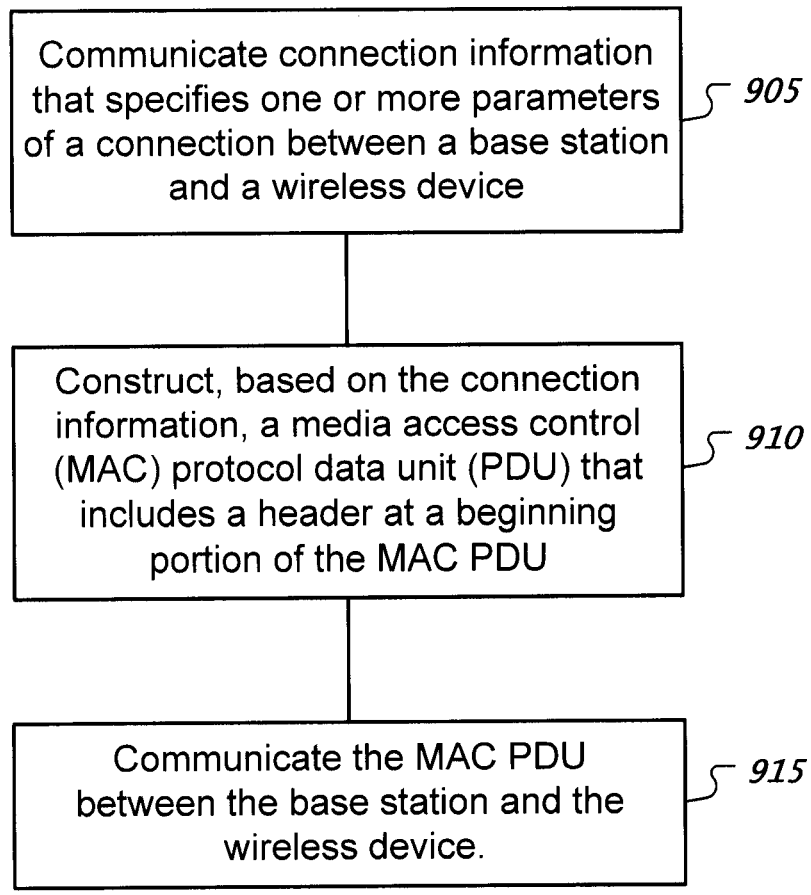
FIG. 9 shows an example of a radio station process.

FIG. 9 shows an example of a radio station process. A radio station can communicate connection information that specifies one or more parameters of a connection between the radio station and another radio station, e.g., a base station and a wireless device (905). The connection information can be indicative of a station identifier. The connection information can be indicative of whether data packets associated with the connection include a cyclic redundancy check. The connection information can be indicative of a whether data packets associated with the connection include encrypted information. In some implementations, connection information can include a flag to signal cyclic redundancy check inclusion. In some implementations, connection information can include a flag to signal encryption.

A radio station can construct, based on the connection information, a MPDU that includes a header at a beginning portion of the MPDU (910). A header can include a first flag that indicates a header type. The first flag can be one bit in size. The header can include a second flag that indicates whether there is a subheader inclusion following the header in the MPDU. The second flag can be one bit in size. The header can include a flow identifier that, together with the station identifier, identifies the connection. The header can include a length value that indicates a length of the MPDU A radio station can communicate the MPDU with another radio station (915). In some implementations, communicating the MPDU can include transmitting a signal, based on Orthogonal Frequency Division Multiple Access (OFDMA), that includes the MPDU.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
communicating connection information that specifies one or more parameters of a connection between a base station and a wireless device, the connection information indicative of (i) a station identifier, (ii) whether data packets associated with the connection include a cyclic redundancy check, and (iii) whether data packets associated with the connection include encrypted information;

constructing, based on the connection information, a media access control (MAC) protocol data unit (PDU) that includes a header comprising one or more bytes at a beginning portion of the MAC PDU, the header comprising: (i) a first flag that indicates a header type, (ii) a second flag that indicates whether there is a subheader inclusion following the header in the MAC PDU, (iii) a flow identifier that, together with the station identifier, identifies the connection, and (iv) a length value that indicates a length of the MAC PDU, wherein the header has a type that is selected based on a size of the MAC PDU to be one of a generic MAC header, a compact MAC header, and a signaling MAC header;

including a subheader immediately following the header in the MAC PDU, wherein the second flag indicates a presence of the subheader, wherein the subheader includes a third flag that indicates whether, following the subheader in the MAC PDU, there is an inclusion of an additional subheader in the MAC PDU; and communicating the MAC PDU between the base station and the wireless device.

2. The method of claim 1, wherein the subheader includes a type field that indicates a type of the subheader.

3. The method of claim 1, wherein constructing the MAC PDU comprises:
including a fragmentation subheader in the MAC PDU; and
including, immediately after the fragmentation subheader, a portion of a service data unit.

4. The method of claim 3, wherein the fragmentation subheader is a last subheader in the MAC PDU, wherein the fragmentation subheader does not include subheader type identifier information.

5. The method of claim 1, wherein constructing the MAC PDU comprises:
including a packing subheader in the MAC PDU; and
including, immediately after the packing subheader, at least a portion of a service data unit.

6. The method of claim 5, wherein the packing subheader is a last subheader in the MAC PDU, wherein the packing subheader does not include subheader type identifier information.

7. The method of claim 1, wherein the connection information is indicative of whether a Hybrid Automatic Repeat Request (HARD) is used in association with the connection.

8. The method of claim 1, wherein the first flag is one bit in size, wherein the second flag is one bit in size.

9. The method of claim 1, wherein the header does not include cyclic redundancy check indication (CI) bit, wherein the header does not include an Encryption Control (EC) bit.

10. The method of claim 1, wherein the header does not include the station identifier.

11. The method of claim 1, wherein the header does not include a TYPE field that specifies which subheaders are included in the MAC PDU via a bit map.

12. The method of claim 1, wherein a layout of the header is based on one of multiple header types including a first header type that includes a first length field and a different, second header type the includes a second length field, wherein the second length field is smaller than the first length field.

13. The method of claim 1, wherein the layout of the header is based on the first header type, wherein the header includes a header check sequence to support header error detection, the header check sequence being based on a portion of the header.

14. The method of claim 13, wherein a field size of the header check sequence is one of 5 bits, 6 bits, or 7 bits.

15. The method of claim 13, wherein the header includes an Encryption Key Sequence (EKS) identifier that signals information about an encryption key associated with one or more encrypted portions of the MAC PDU.

16. The method of claim 15, wherein a field size of the EKS is one bit.

17. The method of claim 12, wherein the layout of the header is based on the second header type, wherein the header includes a flag that indicates whether there is a change of a traffic encryption key, wherein the header includes a flag that indicates whether there is a change of a traffic encryption key.

18. The method of claim 17, wherein the header does not include cyclic redundancy check indication (CI) bit, wherein the header does not include an Encryption Control (EC) bit, wherein the header does not include the station identifier, wherein the header does not include a header check sequence (HCS).

19. The method of claim 18, wherein the header does not include a TYPE field that specifies which subheaders are included in the MAC PDU via a bit map.

20. The method of claim 17, wherein the first flag is one bit in size, wherein the second flag is one bit in size.

21. The method of claim 1, further comprising:
communicating a signal between the base station and the wireless device, the signal comprising a signaling MAC header, the signaling MAC header comprising:
a flag that distinguishes between a signaling MAC header type and a compact MAC header type for data;
a flag that indicates whether there is a subheader inclusion following the signaling MAC header;
a flag that signals an association with a MAC management connection;
a flag that indicates whether there is a change of a traffic encryption key; and
a header check sequence (HCS) to support header error detection, the header check sequence being based on a portion of the signaling MAC header.

22. The method of claim 21, wherein a field size of the header check sequence is one of 5 bits, 6 bits, or 7 bits.

23. The method of claim 1, wherein communicating the MAC PDU comprises transmitting a signal, based on Orthogonal Frequency Division Multiple Access (OFDMA), that includes the MAC PDU.

24. A system for wireless communications, comprising:
multiple base stations to provide wireless communications to wireless devices, each base station configured to:
communicate connection information that specifies one or more parameters of a connection between a base station and a wireless device, the connection information indicative of (i) a station identifier, (ii) whether data packets associated with the connection include a cyclic redundancy check, and (iii) whether data packets associated with the connection include encrypted information;
construct, based on the connection information, a media access control (MAC) protocol data unit (PDU) that includes a header comprising one or more bytes at a beginning portion of the MAC PDU, the header comprising: (i) a first flag that indicates a header type, (ii) a second flag that indicates whether there is a subheader inclusion following the header in the MAC PDU, (iii) a flow identifier that, together with the station identifier, identifies the connection, and (iv) a length value that indicates a length of the MAC PDU, wherein the header has a type that is selected based on a size of the MAC PDU to be one of a generic MAC header, a compact MAC header, and a signaling MAC header;

include a subheader immediately following the header in the MAC PDU, wherein the second flag indicates a presence of the subheader, wherein the subheader includes a third flag that indicates whether, following the subheader in the MAC PDU, there is an inclusion of an additional subheader in the MAC PDU; and communicate the MAC PDU between to one or more wireless devices.

25. The system of claim 24, wherein the base station is further configured to select the generic MAC header when the size of the MAC PDU is equal to or greater than a pre-determined size.

26. The system of claim 24, wherein the base station is further configured to select the compact MAC header when the size of the MAC PDU is smaller than a pre-determined size.

* * * * *